United States Patent
Timm et al.

[11] Patent Number: 5,969,640
[45] Date of Patent: Oct. 19, 1999

[54] METHOD FOR SPACING CONTROL FOR A MOTOR VEHICLE

[75] Inventors: Klaus Timm, Wentorf; Hubert Weisser, Lehre; Ralf Bergholz, Braunschweig, all of Germany

[73] Assignee: Volkswagen AG, Wolfsburg, Germany

[21] Appl. No.: 08/859,634

[22] Filed: May 20, 1997

[30] Foreign Application Priority Data

Jun. 20, 1996 [DE] Germany .............. 196 24 615

[51] Int. Cl.$^6$ ....................... G08G 1/16
[52] U.S. Cl. ............... 340/903; 340/435; 180/169; 701/96
[58] Field of Search .............. 340/903, 904, 340/906, 901, 435, 436; 180/169, 170, 179; 701/96, 97, 98; 348/149

[56] References Cited

U.S. PATENT DOCUMENTS

| | | | |
|---|---|---|---|
| 4,621,705 | 11/1986 | Etoh | 180/169 |
| 4,809,183 | 2/1989 | Eckert | 364/426.04 |
| 5,166,881 | 11/1992 | Akasu | 701/96 |
| 5,189,619 | 2/1993 | Adachi et al. | 701/96 |
| 5,375,060 | 12/1994 | Nocker | 340/903 |
| 5,396,426 | 3/1995 | Hibino et al. | 701/96 |
| 5,400,864 | 3/1995 | Winner et al. | 180/169 |
| 5,545,960 | 8/1996 | Ishikawa | 318/587 |
| 5,594,645 | 1/1997 | Nishimura et al. | 340/903 |
| 5,629,669 | 5/1997 | Asano et al. | 340/436 |
| 5,629,851 | 5/1997 | Williams et al. | 340/903 |
| 5,670,953 | 9/1997 | Satoh et al. | 340/903 |
| 5,689,422 | 11/1997 | Heymann et al. | 340/903 |

FOREIGN PATENT DOCUMENTS

| | | |
|---|---|---|
| 0612641 | 8/1994 | European Pat. Off. . |
| 0661188 | 12/1994 | European Pat. Off. . |
| 2732651 | 11/1996 | France . |
| 4100993 | 7/1991 | Germany . |
| 4201970 | 8/1992 | Germany . |
| 19502954 | 1/1995 | Germany . |
| 19711819 | 10/1997 | Germany . |
| 2295698 | 6/1996 | United Kingdom . |
| 9510053 | 4/1995 | WIPO . |

OTHER PUBLICATIONS

"Distance Control on Vehicles with Fuzzy Control" by Holve et al.

*Primary Examiner*—Jeffery A. Hofsass
*Assistant Examiner*—Van T. Trieu
*Attorney, Agent, or Firm*—Baker & Botts, L.L.P.

[57] ABSTRACT

The specification discloses a method for spacing control for a motor vehicle, in which the current driving speed of the motor vehicle and the current spacing of the vehicle from an object in front of the vehicle are determined by sensor devices, and a spacing-dependent required acceleration is produced from the detected variables. For this purpose, a speed-dependent required acceleration is determined from a desired speed which is manually predetermined by the vehicle driver, and is compared with the spacing-dependent required acceleration. A manipulated variable for the driving engine and/or the braking system of the motor vehicle is then generated as a function of the required acceleration.

42 Claims, 3 Drawing Sheets

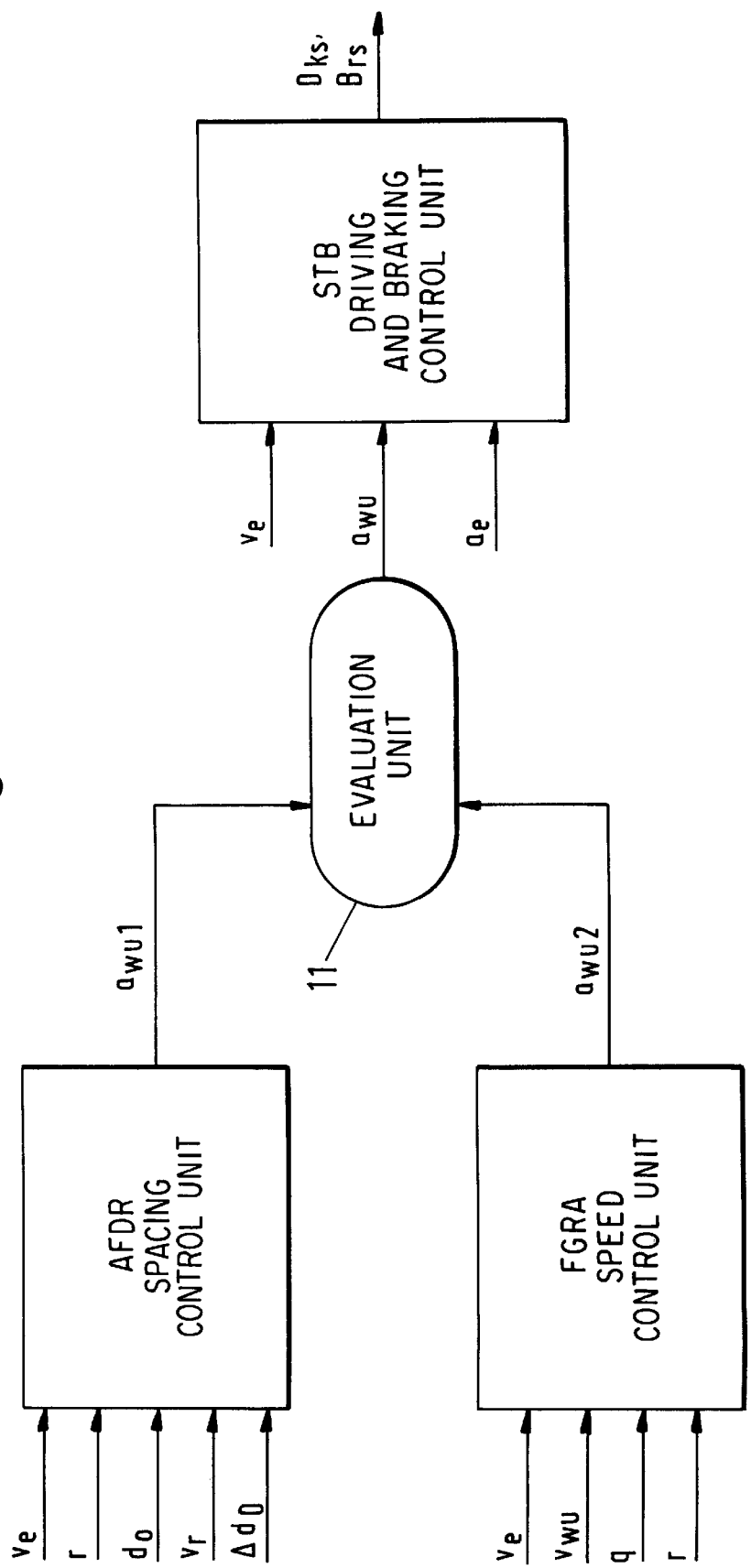

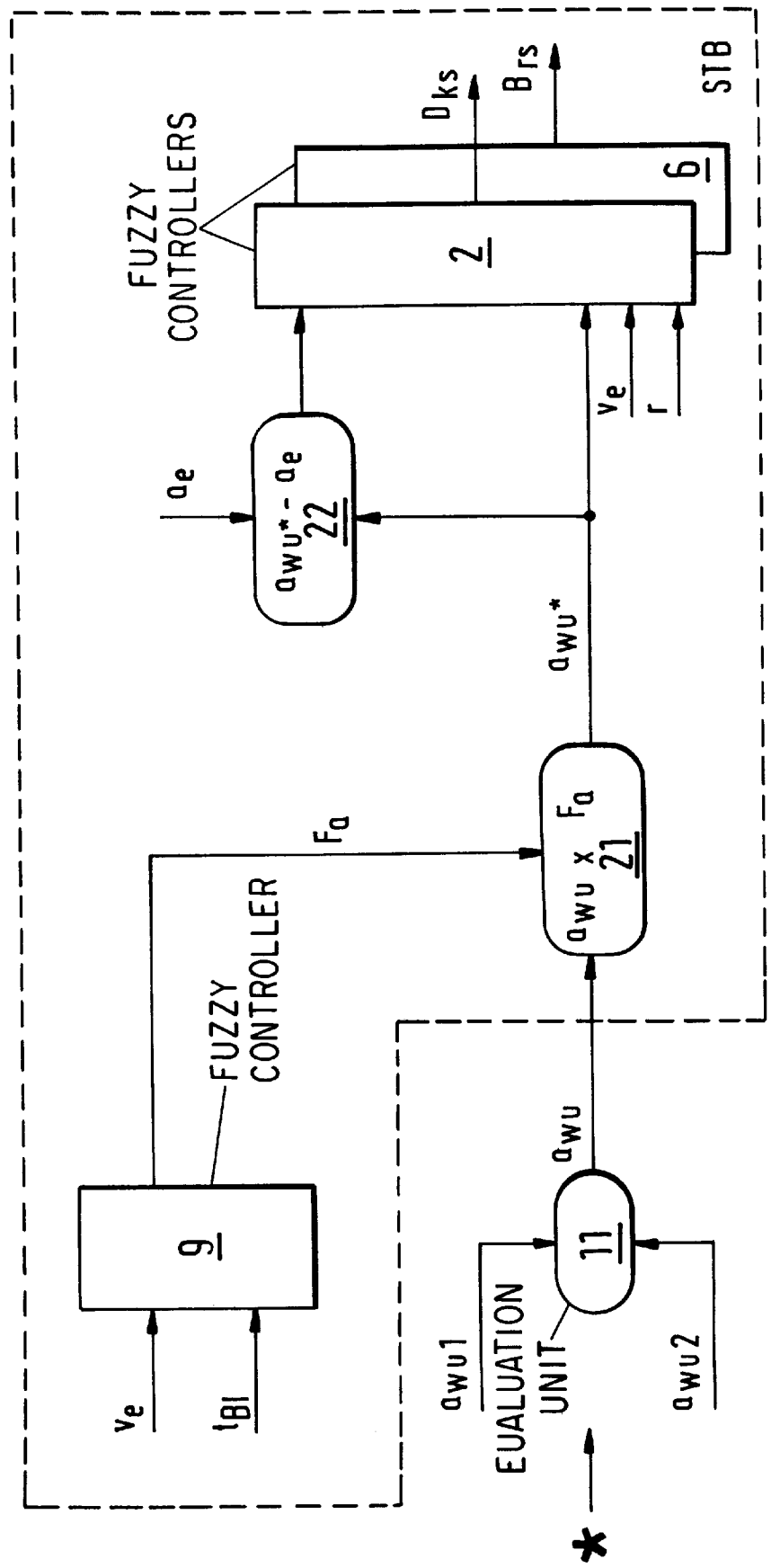

METHOD FOR SPACING CONTROL FOR A MOTOR VEHICLE

BACKGROUND OF THE INVENTION

This invention relates to methods for controlling the spacing of a motor vehicle from an object in front of the vehicle, in which at least the present driving speed of the motor vehicle and the present spacing from an object in front of the motor vehicle are determined by sensor devices and a spacing-dependent required acceleration value is determined from the sensed variables, and to an arrangement for carrying out the method.

Improvements in the field of motor vehicle electronics have led to the situation in which electronic systems which relieve the vehicle driver of routine functions are gaining increasing importance. These electronic systems include, inter alia, a speed control system, which has been known for a long time, in which the driver can preselect a desired speed which is then maintained by the system.

Because of increasing volumes of traffic, it has become necessary to make such speed control additionally dependent on the current traffic situation since the driver would otherwise be compelled to intervene continually in the control of the vehicle speed.

In the publication "Abstandsregelung von Fahrzeugen mit Fuzzy Control" [spacing control of vehicles, using fuzzy control], Tagungsband der 3. Dortmunder Fuzzy Tage, Reihe Informatik Aktuell, Springer Verlag 1993, a fuzzy vehicle spacing controller is described which automatically maintains a predetermined required spacing of a vehicle from another motor vehicle travelling in front of the vehicle under various boundary conditions. The fuzzy spacing control described in the publication, which includes a three-stage fuzzy controller, uses simple min/max operators and the center of gravity method for defuzzification following each stage. Instead of a fixedly defined required spacing, a variable required spacing is determined in the first fuzzy controller which depends on the driver type and the weather, in addition to the current vehicle speed. The driver type and the weather are standardized parameters having a predetermined value range which is determined by an external sensing mechanism, but an arrangement for determination of a driver type is not described in the publication.

The three input data, i.e., driver type, weather, and vehicle speed, are fuzzified and projected onto the required spacing by two control matrices. In the second fuzzy controller, the current spacing supplied by the sensing mechanism is compared to a required spacing determined in the first fuzzy controller and the acceleration required to maintain the desired spacing, which is dependent on the driver type, is determined. The desired vehicle speed is entered directly by the driver and, in the third fuzzy controller, this leads to a threshold value determination as a function of the predetermined desired speed. Subsequently, as a function of the required acceleration and the actual acceleration, the pedal position of a combined accelerator and braking pedal is determined.

SUMMARY OF THE INVENTION

Accordingly, it is an object of the present invention to provide a method for spacing control for a motor vehicle which overcomes disadvantages of the prior art.

Another object of the invention is to provide a method for spacing control and an arrangement for carrying out the method by which a motor vehicle spacing can be controlled in a speed-varying traffic situation and, upon detection of a moving object in front of the motor vehicle, the speed of the vehicle is set equal to the speed of the object in front of the motor vehicle while maintaining a required spacing from the object.

These and other objects of the invention are attained by determining a speed-dependent required acceleration from at least a desired speed, which is manually predetermined by the vehicle driver, and which is compared to a spacing-dependent required acceleration. A manipulated variable for the driving engine and/or the braking system of the motor vehicle is generated as a function of the required acceleration value.

In order to determine the spacing-dependent required acceleration, a first controller is supplied with at least the present driving speed of the motor vehicle. In a preferred embodiment, the current road friction coefficient is additionally determined and likewise serves as an input variable to the controller. It is also possible to supply the controller with a parameter which is dependent upon the prevailing visibility conditions and/or the acceleration of the object from which a spacing must be maintained. From the input variables, the first controller determines a required spacing from the object in front of the motor vehicle. In addition, the present spacing from the object in front of the vehicle is determined by a sensor device and is compared with the current required spacing. The difference between the current spacing and the desired spacing, together with the speed difference between the motor vehicle and the object in front of it, is supplied to a second controller, which may additionally have as an input parameter the current vehicle speed. From these variables, the second controller determines the spacing-dependent required acceleration.

According to one embodiment of the invention, the determination of the driving speed-dependent required acceleration is carried out in a third controller which, in addition to the current vehicle speed, is supplied with a variable representing the difference between the manually predetermined desired speed and the current vehicle speed.

In order to take into account specific driving situations, for example getting-into-line maneuvers, a driving situation-dependent required spacing is determined and the normal required spacing formed by the first controller is modified as a function of this driving situation-dependent required spacing. In this case, the current spacing from the object in front of the motor vehicle is made to conform to the modified required spacing.

Furthermore, provision can be made to base the required spacing on the individual driving behavior of a driver. For this purpose it is possible to add to the required spacing, by a switch which can be operated by the driver, a further spacing component which is dependent upon the driver's mode of driving. According to another embodiment, the first controller, which generates the required spacing at least as a function of the current vehicle speed, can be adapted to a particular driver by a learning process.

According to further embodiment of the invention, the manually predetermined desired speed is changed as a function of a curve-dependent required speed, in order to adapt part of the speed control to driving through curves. Preferably, for this purpose at least, a detected transverse slip or transverse acceleration and the prevailing road friction coefficient are supplied to a sixth controller, which forms the curve-dependent required speed from its input variables. In one arrangement, the controller additionally receives the current vehicle speed as an input variable.

The manually predetermined desired speed can also be changed as a function of a virtual desired speed, which is formed on the basis of detected driving states.

Furthermore, in another embodiment of the invention, a seventh controller is supplied with the current vehicle speed and with a registered actuating time of a device such as a turn indicator identifying an overtaking maneuver, and the controller generates from the two variables an acceleration factor which modifies the required acceleration to produce the manipulated variables for the driving engine.

In order to form one of manipulated variables for the driving engine, a fourth controller is preferably supplied with the current vehicle speed and, in addition to the required acceleration, the difference between the required acceleration and the current acceleration of the motor vehicle over time. In addition, the prevailing road friction coefficient is supplied to the fourth controller for adaptation of the manipulated variable to the road conditions.

According to a further embodiment of the invention, these variables are also made available to a fifth controller for forming the manipulated variable for the braking system.

One advantage of the method according to the invention is that no size requirements of the driving engine or of the braking system are needed.

According to a further aspect of the invention, an arrangement for carrying out the method includes a plurality of mutually interlinked fuzzy controllers which are adaptable in their membership functions and in their rules in order to simulate the driving behavior of each individual driver.

BRIEF DESCRIPTION OF THE DRAWINGS

Further objects and advantages of the invention will be apparent from a reading of the following description in conjunction with the accompanying drawings, in which:

FIG. 1 is a schematic block diagram showing a representative arrangement for spacing control; and FIGS. 2a and 2b are sections of a schematic diagram illustrating a representative embodiment of a spacing control arrangement having a system of mutually interlinked fuzzy controllers.

DESCRIPTION OF PREFERRED EMBODIMENTS

Figure 2A:
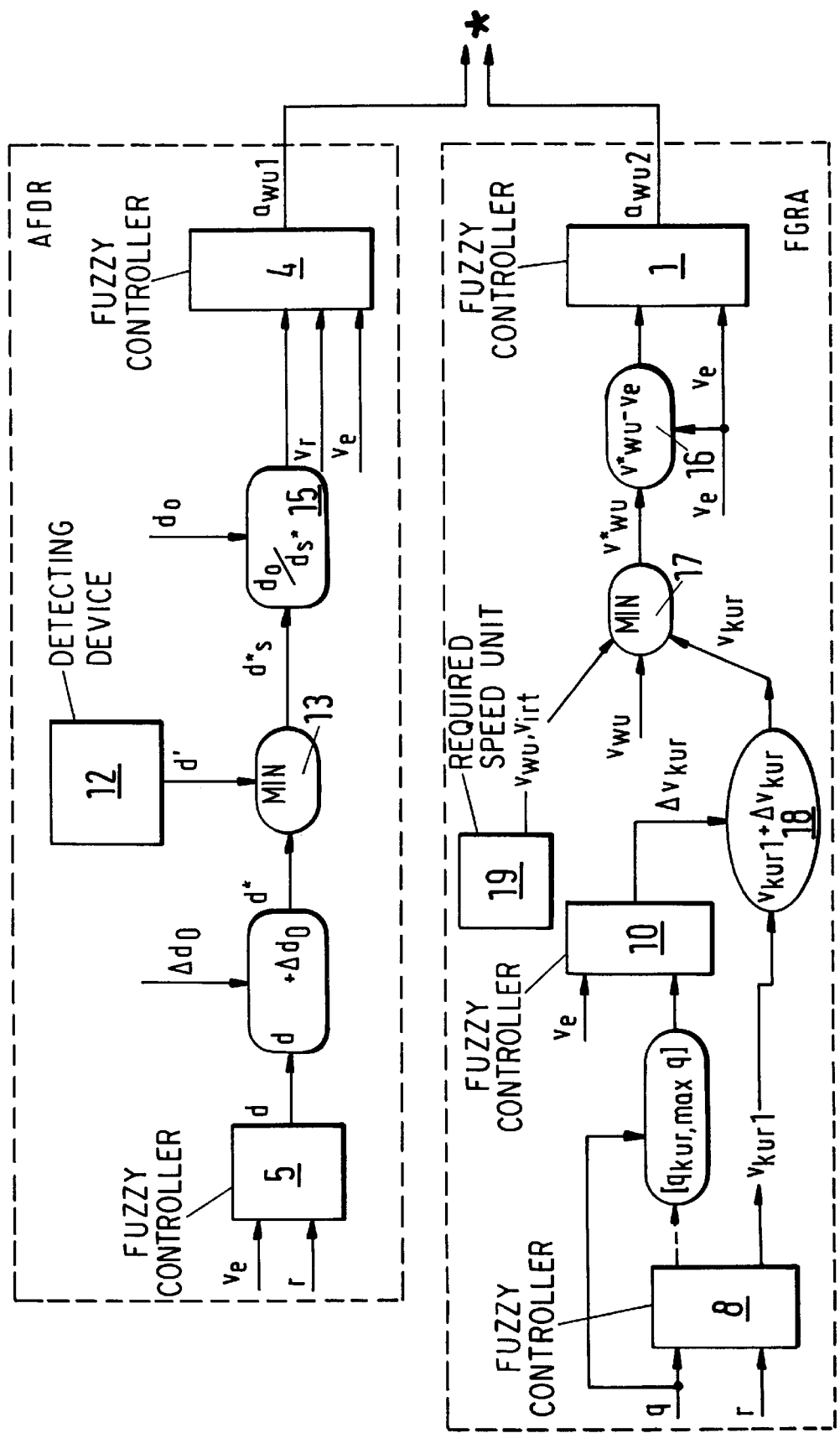

In the typical embodiment of the invention shown in FIG. 1, a unit AFDR is provided for controlling the spacing from an object in front of a motor vehicle containing the unit, in particular another vehicle travelling in front, and another unit FGRA is provided for controlling the current speed of the motor vehicle to a desired speed $v_{wu}$ which may be predetermined at least manually by the vehicle driver. The unit AFDR for controlling the spacing from the other vehicle generates a spacing-dependent required acceleration $a_{wu1}$ as a function of five input variables, i.e., the current driving speed $v_e$, the road friction coefficient r, the current spacing from the other vehicle $d_o$, the speed difference between the vehicle and the vehicle in front of it $v_r$, and the spacing appropriate to the particular driver of the vehicle $\Delta d_0$. The unit FGRA for controlling the vehicle speed generates a speed-dependent required acceleration $a_{wu2}$ based on four input variables i.e.: $v_e$; the transverse slip q; r; and the required speed $v_{wu}$. The meaning of the input variables will be explained in more detail later with reference to FIG. 2.

The two required accelerations $a_{wu1}$ and $a_{wu2}$ are evaluated by an operator 11 as a function of the driving situation and, dependent on that evaluation, one of the two required accelerations $a_{wu}$, together with at least the current acceleration $a_e$ and the current vehicle speed $v_e$, are supplied to a unit STB for calculating two manipulated variables, i.e., a variable $D_{ks}$, for controlling the driving engine and a variable $B_{rs}$ for controlling the braking system of the motor vehicle.

FIGS. 2a and 2b, taken together, constitute a detailed schematic diagram of an arrangement for spacing control having a plurality of interlinked multidimensional fuzzy controllers 1, 2, 4, 5, 8 and 10. These fuzzy controllers may, for example, be of the type described in detail in the copending application of the same inventors Ser. No. 08/859,636, filed May 20, 1997. The spacing control arrangement is provided as an aid to a driver of a vehicle which is capable of simulating the individual driving behavior of the driver.

As shown in FIG. 2a, the unit AFDR, which determines the spacing-dependent required acceleration $a_{wu1}$, comprises a two-dimensional fuzzy controller to which the current driving speed $v_e$ of the motor vehicle and the current road friction coefficient r are supplied as input variables. From those two input variables, the fuzzy controller 5 determines a required spacing $d_{soll}$ from another vehicle travelling in front of the vehicle containing the spacing control arrangement. In order to increase the utility of the spacing control arrangement, this controller may be adaptable by a learning phase to the driving characteristics of a particular vehicle driver.

Specific driving situations, for example, closely grouped vehicles getting into line, are detected by a detecting device 12, and a driving situation-dependent required spacing $d'_{soll}$ is determined which, together with the desired spacing $d_{soll}$ is supplied to a MIN operator 13 which selects the smaller value $d^*_s$ of the two required spacings $d_{soll}$ and $d'_{soll}$ for the spacing control. If the controller 5 is not arranged to be adaptable to the driver by learning, a spacing difference value $\Delta d_0$ that is appropriate to the specific driver and takes into account the driving mode of that driver can optionally be set by the driver by a switch in the motor vehicle.

The difference value $\Delta d_0$ is added to the value $d_{soll}$ to produce a modified required spacing $d^*_{soll}$ which is compared with the driving situation-dependent required spacing $d'_{soll}$. In the case of a vehicle driver driving in a very sporty manner, $\Delta d_0$ may be very small or zero. The modified required spacing $d^*_s$ is transmitted to a further operator 15 to which the current spacing $d_0$ to the motor vehicle travelling in front is also supplied. In the operator 15, the current spacing $d_0$ is compared with the modified required spacing $d^*_s$ and the ratio $d_0/d^*_s$ is determined. This ratio is supplied, together with the current vehicle speed $v_e$ and the speed difference $v_r$ from the vehicle travelling in front, to the fuzzy controller 4, which determines the spacing dependent required acceleration awl from these variables.

The unit FGRA of the spacing control arrangement, which determines the speed-dependent required acceleration $a_{wu2}$, includes the fuzzy controller 1 to which the current vehicle speed $v_e$, and the difference between a desired speed $v^*_{wu}$ and the current vehicle speed $v_e$ which is provided by an operator 16, are supplied in order to generate the required acceleration $a_{wu2}$. In the illustrated embodiment, the desired speed $v^*_{wu}$ takes into account a plurality of speed-related variables. First, it can represent either the desired speed $v_{wu}$ which is predetermined by the vehicle driver, or a curve-dependent required speed $v_{kur}$, or a virtual required speed $v_{virt}$. These speed values are compared with one another via a MIN operator 17, and the lowest speed value is transmitted to the operator 16 as the desired speed $v^*_{wu}$. The virtual required speed $v_{virt}$ is determined in a device 19 as a function of predetermined driving states. In order to form the curve-dependent required speed $v_{kur}$ according to the illustrated embodiment, the fuzzy controller 8 receives the transverse slip q or else the transverse acceleration and the current road friction coefficient r, which may be determined in any conventional manner, as input variables, and generates a curve-dependent speed value $v_{kur1}$. Furthermore, the fuzzy controller 10 forms a differential speed value $\Delta v_{kur}$ from the current vehicle speed $v_e$ and the transverse slip q and this value is added to the speed value $v_{kur1}$ in an operator 18.

In order to produce the differential speed value $\Delta v_{kur}$, provision can alternatively be made to calculate a maximum permissible transverse slip $q_{max}$ from the transverse slip q and the friction coefficient r, and to transmit the magnitude of the difference between the maximum permissible transverse slip $q_{max}$ and the instantaneous transverse slip q to the fuzzy controller 10.

As shown in FIG. 2b, the spacing-dependent required acceleration $a_{wu1}$ and the speed-dependent required acceleration $a_{wu2}$ are compared with each other by an operator 11 and the smaller of the two required accelerations $a_{wu}$ is supplied to the unit STB for calculating the manipulated variables $D_{ks}$ and $B_{rs}$. It is also possible to evaluate the spacing-dependent required acceleration $a_{wu1}$ and the speed-dependent required acceleration $a_{wu2}$ as a function of the driving situation and, depending on that evaluation, transfer one of the two required accelerations $a_{wu}$ to the unit STB.

The fuzzy controller 9 in the STB unit detects and interprets from its input variables, the vehicle speed $v_e$ and the actuating time $t_{b1}$ of the left-hand turn indicating flasher device of the motor vehicle, and then generates an acceleration factor $F_a$, by which the required acceleration $a_{wu}$ is multiplied in an operator 21. The required acceleration $a^*_{wu}$ formed in this way is supplied to the fuzzy controllers 2 and 6 for forming the manipulated variables $D_{ks}$ and $B_{rs}$ and to an operator 22. The operator 22 forms the difference between the required acceleration $a^*_{wu}$ and the current acceleration $a_e$ of the motor vehicle as an input variable for the two fuzzy controllers 2 and 6. The present driving speed $v_e$ and the prevailing road friction coefficient r form further input variables of the fuzzy controllers 2 and 6.

Although the invention has been described herein with reference to specific embodiments, many modifications and variations therein will readily occur to those skilled in the art. Accordingly, all such variations and modifications are included within the intended scope of the invention.

We claim:

1. A method for spacing control for a motor vehicle comprising the steps of:
    determining current vehicle speed of the motor vehicle and current spacing from an object in front of the motor vehicle by sensor devices;
    determining a spacing-dependent required acceleration to maintain a required spacing to the object;
    comparing a spacing-dependent required acceleration and a speed-dependent required acceleration determined from at least a predetermined desired speed; and
    generating a manipulated variable for controlling a driving engine and/or a braking system as a function of a required acceleration value.

2. A method according to claim 1 wherein the spacing-dependent required acceleration and the speed-dependent required acceleration are compared as a function of a driving situation.

3. A method according to claim 1 including the steps of:
    supplying a first controller with the current vehicle speed as an input variable;
    generating in the first controller a required spacing from the object in front of the motor vehicle;
    comparing the current spacing from the object in front of the motor vehicle with the required spacing to determine a spacing ratio;
    supplying the spacing ratio and a difference between the current speed of the motor vehicle and a speed of the object in front of the motor vehicle to a second controller; and
    determining the spacing dependent required acceleration in the second controller.

4. A method according to claim 1 including the steps of:
    supplying the current vehicle speed and a difference between the desired speed and the current vehicle speed to a third controller; and
    determining the speed-dependent required acceleration in the third controller.

5. A method according to claim 1 including the steps of:
    supplying the required acceleration value to a fourth controller and to a fifth controller;
    generating a manipulated variable for a vehicle driving engine in the fourth controller; and
    generating a manipulated variable for a vehicle braking system in the fifth controller.

6. A method according to claim 1 including the step of:
    supplying a first controller with a road friction coefficient and/or a variable for a prevailing visibility condition as a further input variable.

7. A method according to claim 1 including the steps of:
    comparing the required spacing with a driving situation-related required spacing; and
    comparing the current spacing from the object with a selected one of the required spacing and the driving situation-related required spacing.

8. A method according to claim 1 including the step of:
    adapting the required spacing to a driving characteristic of an individual driver.

9. A method according to claim 1 including the step of:
    adapting a first controller and/or a second controller in a manner specific to an individual driver.

10. A method according to claim 1 including the step of:
    supplying the current vehicle speed to a second controller as a further input variable.

11. A method according to claim 1 including the step of:
    modifying a manually predetermined desired speed value as a function of a curve-dependent required speed.

12. A method according to claim 11 including the step of:
    generating the curve-dependent required speed as a function of the current driving speed.

13. A method according to claim 1 including the steps of:
    supplying a sixth controller with a detected transverse slip and with a current road friction coefficient; and
    determining in the sixth controller a curve-dependent required speed.

14. A method according to claim 13 including the step of:
    generating the curve-dependent required speed as a function of the current vehicle speed.

15. A method according to claim 1 including the steps of:
    generating a virtual desired speed as a function of predefined driving conditions; and modifying the predetermined desired speed as a function of the virtual desired speed.

16. A method according to claim 1 including the steps of:
supplying a seventh controller with the current vehicle speed and with a detected actuating time of a device indicating an overtaking procedure of the motor vehicle; and
generating in the seventh controller an acceleration factor by which the required acceleration value is modified to produce the manipulated variable.

17. A method according to claim 1 including the step of:
supplying the fourth controller with the required acceleration, the current vehicle speed, and the difference between the required acceleration and the present acceleration of the motor vehicle in order to produce the manipulated variable.

18. A method according to claim 1 including the step of:
supplying a fourth controller with the current road friction coefficient.

19. A method according to claim 1 including the step of:
supplying a fifth controller with the required acceleration, the current vehicle speed and the difference between the required acceleration and a detected current acceleration of the motor vehicle in order to form a manipulated variable for the braking system.

20. A method according to claim 19 including the step of:
supplying the fifth controller with a current road friction coefficient.

21. An arrangement for controlling spacing of a motor vehicle from an object in front of the motor vehicle comprising a plurality of interlinked fuzzy controllers responsive to signals representing current speed of the motor vehicle, current spacing of the motor vehicle from an object in front of the motor vehicle, a required spacing of the motor vehicle from an object in front of the motor vehicle, a desired speed of the motor vehicle, and the speed of the object in front of the motor vehicle, to produce an output signal for controlling a driving engine and/or a braking system for the motor vehicle so as to produce a required acceleration of the motor vehicle to maintain the required spacing from the object in front of the motor vehicle.

22. An arrangement according to claim 21, wherein the fuzzy controllers are capable of being adapted in membership functions and rules.

23. An arrangement according to claim 21 wherein the speed control means comprises a means providing a virtual desired speed as a function of preassigned driving conditions, and the predetermined desired speed is varied as a function of the virtual desired speed in an operator.

24. An arrangement according to claim 21 wherein the vehicle driving and braking control means comprises a seventh controller to which the instantaneous road speed and a sensed actuation time of a means for indicating an overtaking process of the motor vehicle are supplied, and the seventh controller supplies an acceleration factor to an operator that alters the required acceleration as a function of the acceleration factor.

25. An arrangement for controlling the spacing of a motor vehicle from an object in front of the motor vehicle comprising:
speed sensor means for sensing instantaneous road speed of the motor vehicle;
spacing sensor means for sensing an instantaneous spacing of the motor vehicle from an object located in front of the motor vehicle;
spacing control means receiving signals supplied from the speed sensor means and the spacing sensor means and receiving a signal representing a predetermined desired speed and providing a spacing-dependent required acceleration based upon the received signals;
speed control means receiving signals representing a manually selected desired speed and the instantaneous road speed of the vehicle and providing a speed-dependent required acceleration;
an operator responsive to a spacing-dependent required acceleration and a speed-dependent required acceleration to provide an output signal representing a required acceleration; and
vehicle driving and braking control means for controlling a vehicle engine and/or a vehicle brake system as a function of the required acceleration.

26. An arrangement according to claim 25 wherein the operator interrelates the spacing-dependent required acceleration and the speed-dependent required acceleration in terms of a vehicle driving condition.

27. An arrangement according to claim 25 wherein the spacing control means comprises:
at least one first controller to which at least the instantaneous road speed is applied as an input quantity and which produces a required spacing from the object in front of the motor vehicle;
an operator relating the sensed instantaneous spacing from the object located in front of the motor vehicle to the required spacing in order to determine a difference value; and
a second controller to which at least the difference value and a predetermined relative speed between the motor vehicle and the object located in front of the motor vehicle are supplied and which determines a required acceleration as a function of the spacing.

28. An arrangement according to claim 23 wherein the first controller receives signals representing a coefficient of road friction and/or a quantity representing prevailing visibility conditions as input signals.

29. An arrangement according to claim 23 wherein the first controller and the second controller in the spacing control means are arranged to respond to specific driver requirements.

30. An arrangement according to claim 23 wherein the second controller of the spacing control means receives a signal representing the instantaneous vehicle speed.

31. An arrangement according to claim 25 wherein the speed control means includes at least a third controller to which at least the instantaneous road speed and a quantity relating a predetermined desired road speed to the instantaneous road speed are supplied and which determines a required acceleration as a function of the road speed values.

32. An arrangement according to claim 25 wherein the vehicle driving and braking control means comprises at least a fourth controller to provide control signals for the vehicle engine and a fifth controller to provide control signals for the vehicle brake system in response to signals representing required acceleration.

33. An arrangement according to claim 32 wherein the fourth controller also receives signals representing the instantaneous road speed and the difference between the required acceleration and the actual acceleration of the motor vehicle.

34. An arrangement according to claim 32 wherein the fourth controller also receives signals representing the prevailing coefficient of road friction.

35. An arrangement according to claim 32 wherein the fifth controller also receives signals representing the instantaneous road speed and the difference between the required acceleration and a sensed actual acceleration of the motor vehicle.

36. An arrangement according to claim 32 wherein the fifth controller also receives signals representing the prevailing coefficient of road friction.

37. An arrangement according to claim 25 wherein the spacing control means comprises an operator for determining the required spacing from a required spacing dependent on a function of a driving situation and from the instantaneous spacing from the object located in front of the motor vehicle based on a value of the required spacing as generated in the operator for determining the required spacing.

38. An arrangement according to claim 25 wherein the predetermined desired speed is a variable dependent upon a curve-dependent required speed.

39. An arrangement according to claim 38 wherein the speed control means includes a sixth controller to which at least a determined cross slip and a prevailing coefficient of road friction are supplied and which produces a curve-dependent required acceleration value.

40. An arrangement according to claim 38 wherein the speed control means includes a controller which produces a curve-dependent speed value from the instantaneous vehicle speed and the curve-dependent required speed.

41. An arrangement according to claim 25 wherein each of the controllers is a fuzzy controller.

42. An arrangement according to claim 41 wherein the fuzzy controllers are capable of being adapted in membership functions and rules.

* * * * *